United States Patent [19]

Stocker

[11] 4,197,538

[45] Apr. 8, 1980

[54] PILOT'S TRAFFIC MONITORING SYSTEM

[76] Inventor: Godfrey H. Stocker, 740 Harvard Ave., Claremont, Calif. 91711

[21] Appl. No.: 911,992

[22] Filed: Jun. 2, 1978

Related U.S. Application Data

[63] Continuation-in-part of Ser. No. 710,790, Aug. 2, 1976, abandoned.

[51] Int. Cl.² .............................. G01S 7/22; G01S 9/56
[52] U.S. Cl. ............................ 343/6.5 LC; 343/5 EM
[58] Field of Search ....................... 343/6.5 LC, 5 EM

[56] References Cited

U.S. PATENT DOCUMENTS

| | | | |
|---|---|---|---|
| 2,821,703 | 1/1958 | Knauss | 343/5 EM X |
| 3,030,443 | 4/1962 | Groll et al. | 343/5 EM X |
| 3,035,260 | 5/1962 | Freedman et al. | 343/6.5 R |
| 3,167,772 | 1/1965 | Bagnall Jr. et al. | 343/6.5 LC X |
| 3,341,812 | 9/1967 | Perkinson et al. | 343/6.5 LC X |
| 3,493,968 | 2/1970 | Shear et al. | 343/6.5 LC |
| 3,603,993 | 9/1971 | Follen et al. | 343/6.5 LC |
| 3,697,987 | 10/1972 | Arthur | 343/5 EM |
| 3,717,873 | 2/1973 | Riggs | 343/5 EM |

Primary Examiner—Malcolm F. Hubler
Attorney, Agent, or Firm—Frank L. Zugelter

[57] ABSTRACT

A pictorial display system in which continuously updated images of 'other ship' aircraft within a specified airspace envelope are superimposed on a map display along with the pilot's 'own ship' position, whereby collision threats are avoided by taking corrective flight action. This information is displayed, independently of and without interfering with ground facilities operations and communications, as a response to a low-powered signal transmitted from an onboard FM transceiver-multiplexer unit in which the response in terms of positions and altitudes of other aircraft in electrical form, is received, demodulated and then transformed into digital form. Such digital information along with "own ship" position and altitude in digital form, are fed into an altitude discriminator synchronizer unit. The "own ship" altitude data from existing on-board equipment, is synchronized in digital form with other aircrafts' altitude data; and likewise, the "own ship" navigational data, obtained through existing navigational equipment, is also converted to digital form and is synchronized. All of this synchronized digital information is then applied to a function generator which formats it into a form compatible with the requirements of the pictorial display. This display presents the data to the pilot who is then able to properly manuever the aircraft to achieve safe control thereof in relation to other aircraft, or take the necessary collision avoidance action relative to another aircraft, as the case may be.

12 Claims, 4 Drawing Figures

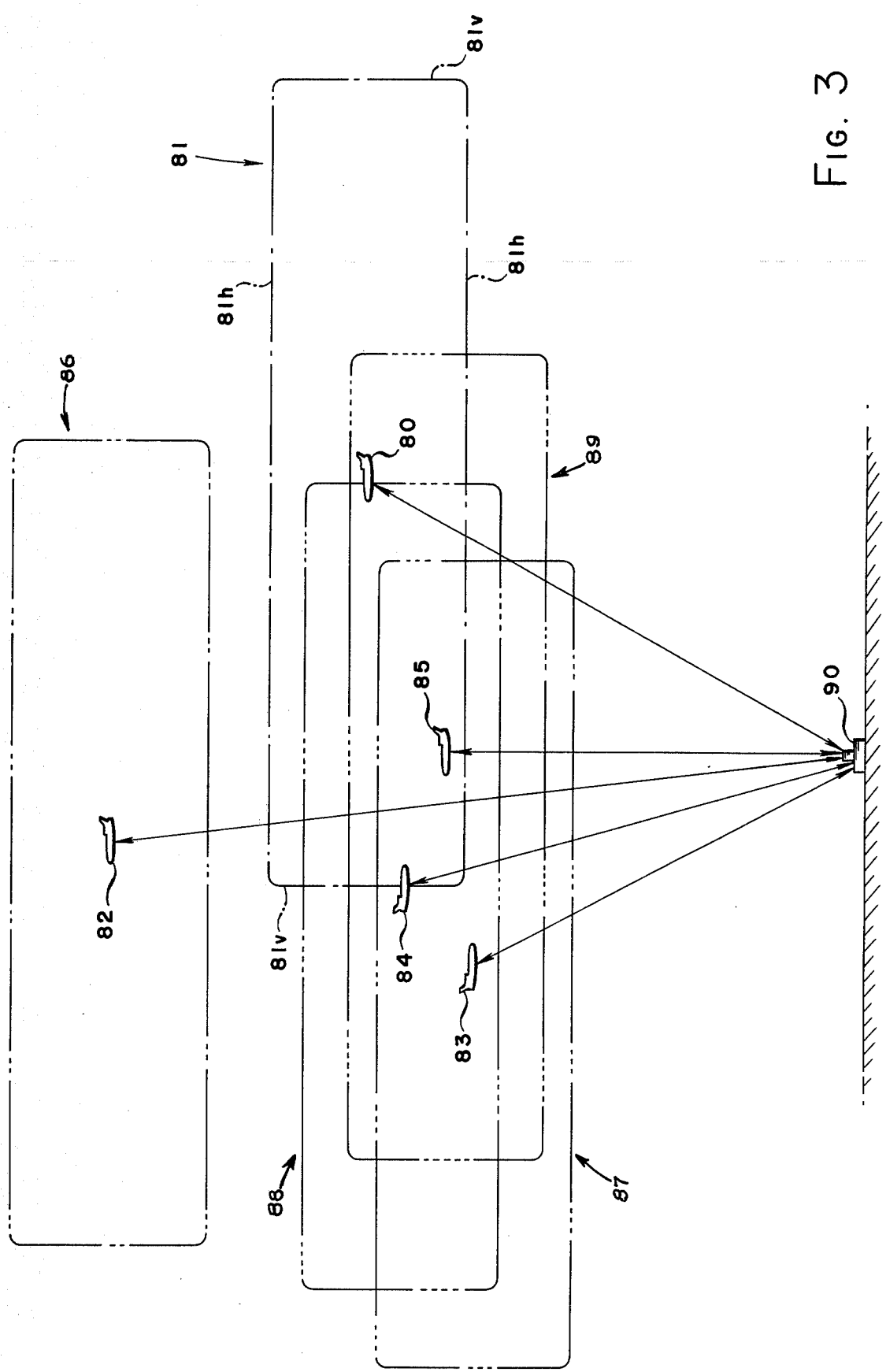

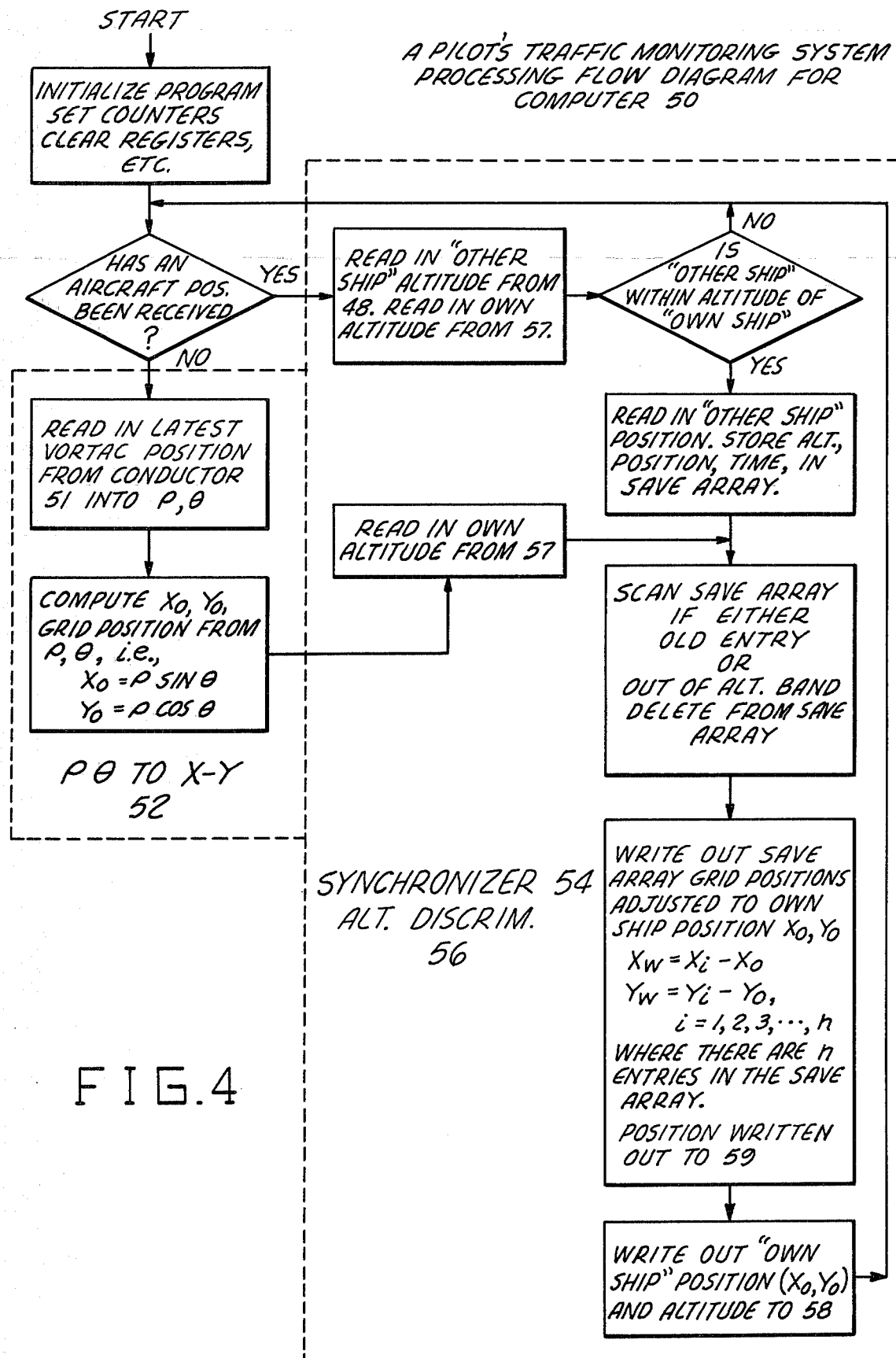

PILOT'S TRAFFIC MONITORING SYSTEM

This application is a Continuation-in-Part of application Ser. No. 710,790, filed Aug. 2, 1976, and entitled "A Pilot's Traffic Monitoring System", now abandoned.

BACKGROUND OF THE INVENTION

1. 1 Field of the Invention

This invention relates to effective monitoring of air traffic and to provide a pilot with hardware and method to avoid collision with other aircraft. In particular, it relates to a method and system or combination of elements which provides an on-board, constantly updated pictorial display of air traffic activity in the vicinity pertinent to an aircraft's flight. The pictorial display represents a dynamic status report on such activity which is readily interpretable by the pilot of the aircraft in monitoring his own and others' flights and for taking action should it be required to avert a collision, possible or actual.

2. Description of and Problems in the Prior Art

The present Air Traffic Control (ATC) system, as required by F.A.A. rules and regulations, is a system operated at ground facilities by personnel thereat. It employs radars for locating in three dimensions, tracking and identifying aircraft within the U.S. airspace. The sensor equipment of the ground facilities comprises two radars: a primary surveillance radar (PSR) for locating and tracking an aircraft and a secondary surveillance radar (SSR), scan-synchronized with the PSR, for interrogating and receiving signals from equipment on cooperating aircraft, such equipment being generally described as an ATC transponder system, and having ARINC characteristics to be more fully described hereinafter. The SSR interrogates aircraft and receives signals which include aircraft identity, and altitude data. These data are processed, combined with the data from the PSR and pictorially displayed at the local ATC center for use in directing air traffic activity in the local terminal control zone and throughout airspace controlled by the United States of America. The control of this traffic activity by such center is effected separately, i.e., through two-way voice radio communication with each aircraft in such control zone.

There are two distinct shortcomings of this presently used system. Data available to a pilot via an ATC center control and concerning positions of other flights in the local control zone are limited and intermittently obtained, especially in inclement weather about a busy terminal area. And secondly, a low data rate of voice communication exists between an air traffic controller in the ground facility and a pilot.

Further, although a pilot knows his own position relative to local radio navigation aids, i.e., as to VORTAC stations, marker beacons, etc., he has only an approximate definition of the positions and altitudes of other aircraft in the immediate vicinity of his own ship. He derives information on such positions of other aircraft through voice radio reports only, from either the air traffic controller who is responsible for controlling the traffic in a specific sector or the voice radio reports heard from the pilots of other aircraft. He does not communicate with such other pilots, and vice versa. Besides the chance for misunderstanding, human memory for oral information is both short and imprecise, and the volume of verbiage to which a pilot is exposed in a crowded control zone tends toward confusion in thought and possibly in action which could result in injury and damage.

These voice radio reports are made in terms of approximate geographical locations, altitudes, and times; perhaps supplemented by headings and speeds or estimates of arrival at another position and altitude. A pilot manages to some degree to sort this out in terms of distinction between traffic that may approach or intrude into the airspace he requires and that which does not represent possible collision threats outside such airspace. Even so, the burden of having to make these assessments while keeping track of his own position and status, changes to which are usually being directed continually by the air traffic controller, adds up to an appreciable work load, imposed at a time often at the end of a long and tiring flight and/or in inclement weather, when the need to concentrate on safe flying or handling of the aircraft is the greatest.

While ground air traffic controllers, using graphic displays, can almost continuously be apprised of the positions of all aircraft in a control zone, this information is available to pilots in voice radio form only, and only incrementally. Often there are relatively long waits between updates; this further increases the burden on each pilot for keeping current his mental picture of the area traffic situation, among other mental and physical duties.

The present invention overcomes these existing disadvantages without sacrificing any requirement of the F.A.A. in its communication requirements for and jurisdiction over flying aircraft in the U.S. airspace. This invention supplements the presently-existing and used ATC system, operating in concert with it yet independently of it and without interference to it or from it.

SUMMARY OF THE INVENTION

An object of this invention is to provide information to a pilot for the purpose of monitoring and managing his ship's movement in relation to other ships' movement in the same vicinity.

Another object of this invention is to avoid collision between and among each other's moving ship.

Another object of this invention is to provide each pilot with a concise, continuously updated readily interpretable pictorial display of the geographic and relative positions of all ship traffic in the vicinity.

Still another object of this invention is to provide an on-board automatic secretary which keeps track of large volumes of dynamic data, sorting it, screening it, and presenting it to the pilot in a straight-forward, easily understandable display.

A further object of the invention is to eliminate ambiguities associated with voice radio communication utilized for the purposes of traffic advisory data and traffic control; say, for example, instructions from a ground-located controller.

Another object of this invention is to provide a system for monitoring air traffic at minimum costs, by avoiding requirements for modifying existing facilities and equipment such as the addition of a north reference to each SSR unit presently employed and those anticipated in the future in the U.S. ATC system.

Another object of this invention is to provide a monitoring system for vicinity aircrafts and which is completely independent of any ground facility control system and yet not interfere with or be interfered by such control system.

Another object of the invention is to provide monitoring by a ground installation or facility of the operation of the radar system used in air traffic control problems.

These and other objects and advantages of the invention will become more apparent by a full reading of the following description, claims appended thereto and the accompanying drawing comprising four (4) sheets.

BRIEF DESCRIPTION OF THE DRAWING

FIG. 3 is an elevational field-of-use presentation of one environment in which the invention is practiced.

FIG. 4 is a flow diagram of an illustrative program utilized in a general purpose digital computer to carry out efficacious and effective operation of the invention.

DESCRIPTION OF THE PREFERRED EMBODIMENT

Figure 1:
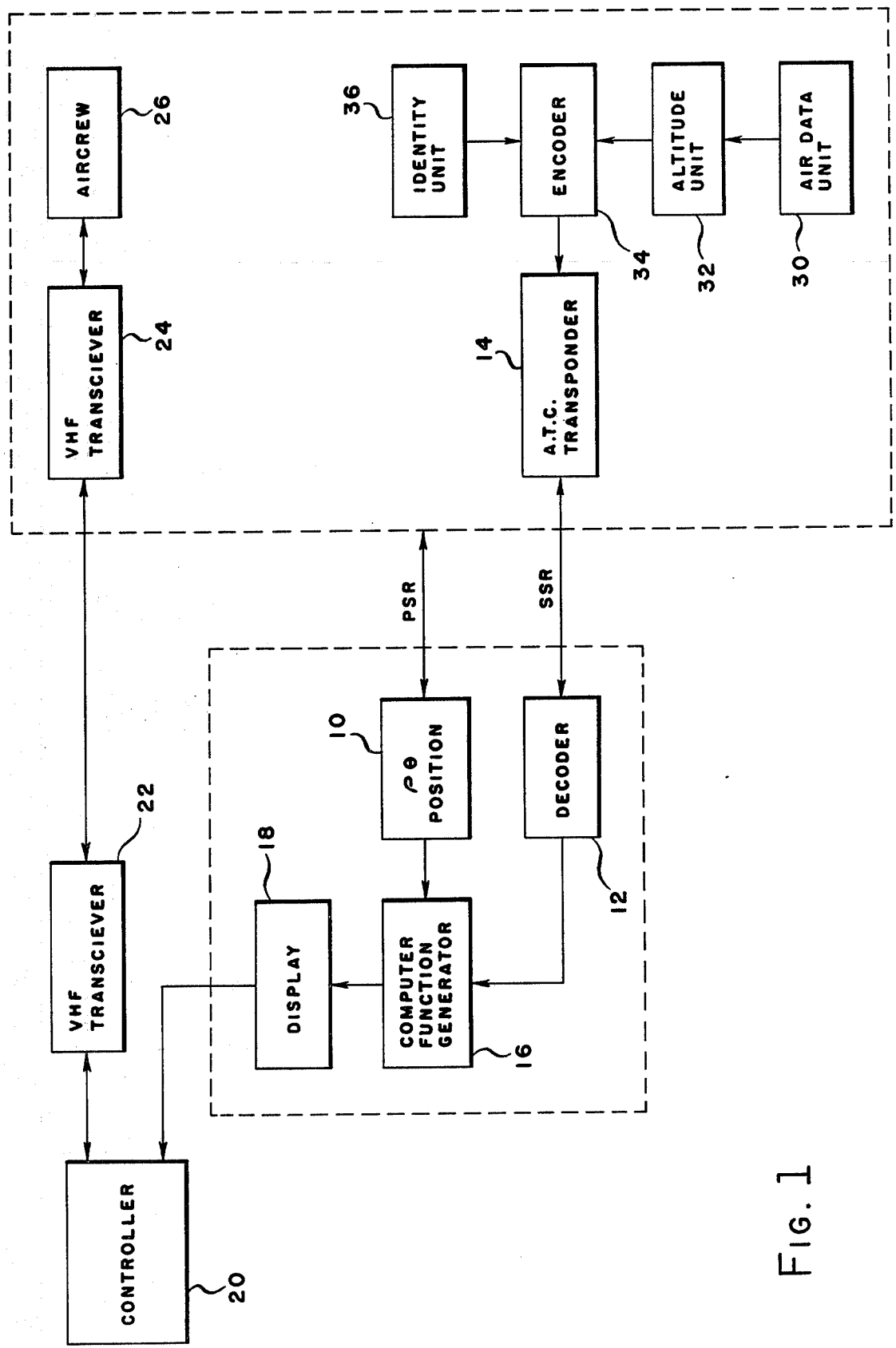
FIG. 1 is a diagrammatic block diagram of the presently existing air traffic control system, showing the elements required at both a ground station facility and those required within an aircraft.

Referring now to the drawing in which reference characters correspond to like numerals hereinafter in the following description, briefly, FIG. 1 illustrates the presently existing system by which a ground ATC facility controls, through voice communication, the flight of an aircraft. The system includes ground equipment for measuring position (range $\rho$ and bearing $\theta$) of an aircraft, such as a PSR unit, and equipment in the aircraft which provides, on demand, identity and altitude signals to such ground facilities. In addition, there is a ground-air radio communication means by which a ground controller advises and instructs the pilot what to do, and the pilot acknowledges.

Figure 2:
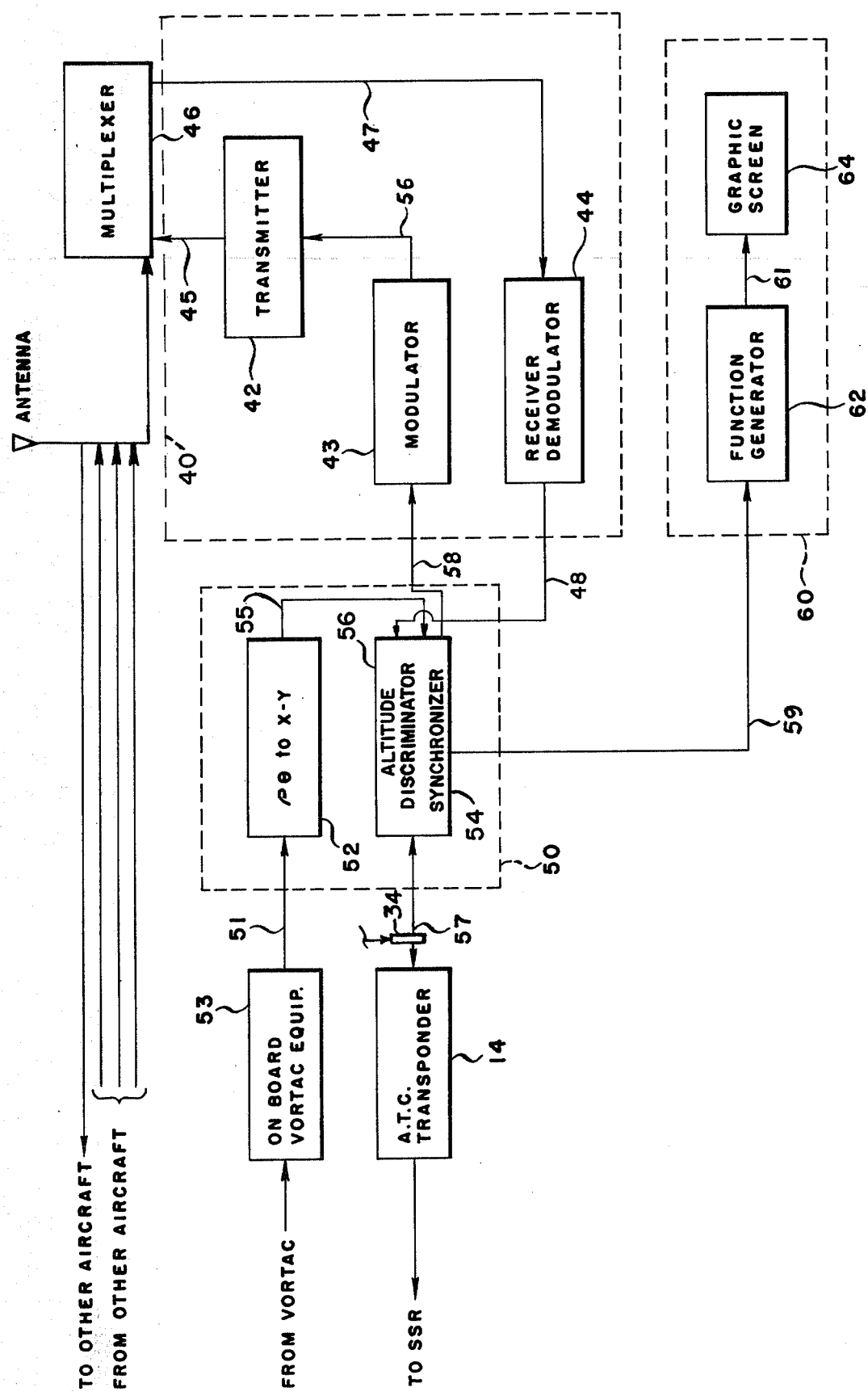
FIG. 2 is a diagrammatic block diagram of a system or combination of elements embodying the invention.

FIG. 2 illustrates an embodiment of the invention in context with existing on-board equipment. A pilot monitors "other ship" and his "own ship" positions, without receiving any data or voice communication from or transmitting any data or voice communication to or through a ground station, at first or at all, in the utilization of the invention.

Referring now more particularly to FIG. 1, a PSR ground radar unit 10 locates and tracks an aircraft 11, and determines its position by measuring its range $\rho$ and bearing $\theta$ of the aircraft from the PSR unit 10 ground site. An SSR ground radar unit 12, scan-synchronized with the PSR unit 10, interrogates a transponder unit 14 aboard the aircraft. The transponder 14 in turn responds thereto by signalling the SSR unit 12 of the aircraft's identity and its altitude.

This information from both radar units 10, 12, respectively, is transformed and decoded to be processed to and through a computer/function generator 16. The generator 16 translates this processed information into suitable electrical form which in turn is applied to a pictorial display 18. The displayed information provides a ground-station controller personnel 20 with the air traffic information he requires to control vicinity aircraft movements. The controller 20 is then properly able to voice communicate with the aircraft's pilot via VHF two-way radio communication. He voice communicates through a ground-stationed transceiver 22 to the aircraft's on board transceiver 24 which receives such voice communication. The flight's aircrew 26 then respond to whatever order, instruction or command is issued by the ground personnel 20, as well as being able in turn to voice communicate with the controller 20 in a reverse and similar fashion, by use and operation of the units 24, 22.

In order for the SSR radar unit 12 to receive the proper information from the aircraft, the transponder 14 is first fed data obtained from information provided by other on-board equipment. An air data unit 30 measures the aircraft's altitude and feeds this information to an altitude reference base unit 32 which passes this "own ship" altitude to the pilot's altimeter (not shown) and also to an encoder unit 34. The encoder 34 is provided to encode into digital form the information from the altitude unit 32, as well as encoding information provided by the aircraft's identity unit 36. All of this data in encoder 34 relating to altitude and aircraft identity, is then applied to the transponder 14. The transponder 14, then, upon interrogation by the ground SSR unit 12, provides through its signal such information.

Thus, the pertinent ground facilities and personnel are aptly knowledgeable to be able to advice, instruct, etc., from the ground to the aircraft.

It should be understood that the referred-to on-ground and on-board aircraft equipment, identified by aforementioned reference characters in the above description and as shown in FIG. 1, are all well known elements in the art, including their constructions, configurations and functions, and their operative connections with one another. Also, the combination thereof as illustrated in FIG. 1 is well known in the art.

FIG. 2 illustrates an embodiment of the invention in associated context to the existing on-board ATC equipment illustraed in FIG. 1. Such embodiment comprises a low-powered FM transmitter or transceiver 42, a modulator unit 43, a receiver/demodulator unit 44 and a multiplexer unit 46; a coordinate transformation unit 52, an altitude discriminator unit 56, and a synchronizer unit 54, all of which is available in a computer hardware 50, and a display means 60 which includes a function generator 62 for formatting data to a graphically presented form as in screen 64 which is visually suitable to the pilot who then perceives updated air vicinity traffic information therefrom.

It should be understood that each of the above identified elements and which are illustrated in FIG. 2 is a known state-of-the-art piece of equipment and functions in its usual manner. It is the combination of these elements (and their subelements) which constitutes a method and system which is the essence of the invention and as set forth in the appended claims.

The elements in FIG. 2 shown within an electronic unit or envelope 40 and the multiplexer 46 are commonly known and designed pieces of equipment, well known in the prior art. The FM transmitter or transceiver 42 is connected by a conductor 45 to the multiplexer 46 through which a transmitted or outgoing message is broadcast from the aircraft on a, say, 0.2% (0.002) duty cycle relative to received signals from other aircraft. Received signals, i.e., incoming signals similar to outgoing signals and received by the multiplexer 46 through an antenna, are received in a receive-to-transmit ratio of 500 to 1. This illustrated duty cycle will minimize mutual interference and can be achieved in the following manner:

Operating frequency: approx. 1000 mHz
Bandwidth: 200 kHz
Data rate: 100 k bits/second Modulation: Differential phase shift keying
Transmitter Output Power: 5 watts Aircraft geographical position and altitude constitute the basic message unit in the transmission and receiving, although ship identity may be included though not necessary to the operation of this invention. This data is in digital message format of about 50 bits. At some future time it may be desirable to expand the message unit; however, a 100 bit format can be presently used. At a 100 k bits/second data rate, up to 500 aircraft in any given area (within the radio horizon) can be accommodated. Random transmissions, however, may cut this by 50% and other factors may further reduce this to, say, 25%. Even so, it is most improbable that there will be as many as even 125 aircraft within a single Air Traffic Control area at the same time.

Each aircraft's data message is broadcast in 1 millisecond (100 bits at 100 k bits/second); and on a transmit duty cycle of 0.2% (0.002), updates can occur each 500 milliseconds, or at a rate of two per second.

The receiver/demodulator 44 receives these incoming signals from the multiplexer 46 via a conductor 47, and in addition to receiving these random incoming signals also demodulates the incoming signal and thence applies it to the discriminator unit 56 by means of a conductor 48. Unit 56 eliminates any total "other ship" position report if this report does not include an altitude report that falls within a preselected band of altitude about "own ship" position. For example, to avoid pictorial displays in graphic screen 64 of much unneeded information, only vehicles around "own ship" within, say ±2000 feet of "own ship" altitude are displayed.

This function of discrimination in altitude is accomplished through the storage in the memory (Save Array, infra) of the computer 50 of the "own ship" altitude, which changes as "own ship" altitude changes. All "other ship" messages received contain their altitudes, and these are simply compared electrically with "own ship" altitude. I.e., through use of a number of "and" and "or" gates in the computer hardware, this examined data is either accepted by meeting the specific requirements of the computer program logic and used accordingly or rejected if these requirements are not met. If they are outside the ±2000 foot (electrical signal) range, the total "other ship" message, including position, is rejected. All "other ship" messages which fall within this ±2000 foot range are accepted, and the accepted messages (comprised of altitude and position) are then processed to the synchronizer unit 54 of the computer 50.

The "own ship" altitude and position signals are already generated as a result of the on-board existing pieces of equipment 30, 32 and 53. The "own ship" altitude signal is in the digital form at the encoder 34, and for purposes of this invention, is transferred therefrom via a conductor 57 to the altitude discriminator unit 56 of the computer 50. The "own ship" navigational data, at VORTAC receiving set 53, is first converted to X-Y or latitude-longitude (Cartesian) coordinates, before receipt thereof by the synchronizer unit 54. To do this, a conductor 51 operatively connects the output of set 53 with the coordinate transformation unit 52 of the computer 50. It is unit 52 which converts the $\rho, \theta$ navigation data to Cartesian form, after which such data is transmitted to the synchronizer unit 54 via a conductor 55, where it is combined without further modification with "own ship" altitude data.

The synchronizer function is essentially an input "gate" which admits one message unit or block at a time, excluding all other signals from the computer input until that message unit or block, of a predetermined format and length, has been completely assimilated by the computer. The input gate then opens to receive the next appropriately formatted message unit or block. Thus, as each accepted message of "other ship" reaches the unit 54, it is completely assimilated in the computer and thence transmitted via a conductor 59 to the function generator 62 for formating. Likewise, as each message of "own ship" altitude reaches the unit 54, it is combined with "own ship" converted navigational data and it is completely assimilated in like fashion by the computer prior to transmission via the conductor 59 to the generator 62.

The combined "own ship" altitude and positional data at the synchronizer unit 54 is also broadcast as an output from the computer 50, by transmitting it via a conductor 58 to the modulator 43, for ultimate radio transmission to other ships in the vicinity and which "other ships" become "own ship" in terms of receiving this output. Many methods of modulation exist; however, since the desired electrical signal is digital, i.e., the desired signal is represented by a sequence of binary digits (bits) of discrete levels, some form of digital modulation is used. Thus, preferably, the phase shift keying method of modulation is used. The phase of the radio frequency carrier is varied in accordance with the binary level of the desired electrical signal. Thus, a binary "one" would transmit the wave carrier with a 180° phase shift and a binary "zero" would transmit the wave carrier with a 0° phase shift. At a receiver, these variations in carrier phase are detected, and the original altitude and positional data stream of "ones" and "zeros" are reconstructed.

With regard to the electronic output of the message comprising altitude and position data on both "own ship" and "other ships" at the synchronizer unit 54, the conductor 59 pulses the output of either or both from the computer 50 to the function generator 62. The generator 62 converts each of these data into a form more readily usable to the "own ship" pilot, particularly as to here, into a graphic presentation of the relative positions of "other ships" and "own ship". I.e., the generator 62 formats such signal into a suitable graphic presentation for screen 64 to which it is applied via a conductor 61.

Formatting is a method of taking an electronic output of a message in one form and converting it into another form that can be more easily used (understood) in a specific application. Here, all the X-Y latitude-longitude electrical signals in digital form and eminating from unit 54 and passing through conductor 59 are fed to the generator 62. The generator 62 takes these electrical signals from the computer 50 via conductor 59 and modifies them to be compatible with the specific requirements of the particular display or graphic screen 64 that is used. The generator 62 also produces the fading of each successive position signal of an "other ship" so that the vector of each "other ship" is shown as a bright spot followed by a series of successively dimmer spots. For example, a screen 64 may include a surface phosphor having some persistence rate which is controlled electrically. On the screen 64, as each new position input is received, the earlier inputs from the generator 62 are dimmed by reducing the voltage of the signal from the conductor 59 as each new input is received.

The type of function generator contemplated here is of an electrical or electronic signal source which produces a signal that actuates a display on a cathode-ray tube (CRT) or other electrical display. It is essentially an oscillator with modulation capacity, whose purpose is to deliver a choice of different waveforms, frequencies, symbols, etc., examples of which are sine wave, triangle waves, sawtooth waves, square waves, and pulses with a provision to sweep.

Typical of commercially available function generators of the type suitable for this system are the Models 203A, 209A, 3300A, 3311A and 3310A/B manufactured and sold, prior to the filing date of the parent application to this case, by the Hewlett-Packard Corporation, Cupertino, Calif.

The flow chart of an efficacious and effective program for computer 50 is illustrated in FIG. 4 and represents how the computer hardware 50 operates on the logic provided by its program. At a given moment of time t=0 relative to a particular "other ship", the program for computer 50 is in a state with the values or parameters of position and altitude of "other ship" and "own ship" being in an initial relative state.

In the event no signal on "other ship" position is received via conductor 48, signals on "own ship's" position are fed to computer 50 from VORTAC set 53. Computer 50 computes in its transformation unit 52 the initial $X_o$, $Y_o$ grid positions therefrom. From the encoder 34, "own ship" altitude is fed to the unit 54, to be combined with "own ship's" grid positions $X_o$, $Y_o$. With no old entry (relative to previously time-stored "other ship's" position and altitude) or no "other ship" being within the designated band of altitude, this data on "own ship" is written out or stored in the computer's memory and is also broadcast via conductor 58, modulator 43, etc., and in accordance with the indicated duty cycle for receipt and transmission of signals. The old entries and out-of-altitude-band "other ship's" data is deleted on the assumption that no signals from any "other ship" have been received.

In the event an "other ship's" signal is received via multiplexer 46, receiver/demodulator 44, etc., its altitude portion of the signal is received by the altitude discriminator 56 of the computer along with receipt of "own ship's" altitude from the encoder (via conductor 57). These altitudes are electrically compared in the discriminator 56, and if the "other ship's" altitude lies outside the band of "own ship's" altitude, computer 50 no longer processes this information, and the computer is returned to an initial state of operation.

In the event the "other ship's" altitude lies inside the band of "own ship's" altitude, then the portion of the signal representing the position of "other ship" is stored in the computer's "Save Array" along with its altitude and time at which it had been introduced into the processing computer. The computer is continuing to scan its "Save Array" for entries of position and altitude of "other ships" in terms of the length of time during which each of such entries have been stored and for those entries whoe signals say that the "other ship" now lies outside the designated "own ship's" band of altitude. And if so, such entries are deleted from its "Save Array" memory function.

For the "Save Array" grid positions of "other ships" which continue to lie inside "own ship's" band of altitude, the signal representing each one of these positions is adjusted relative to the signal representing the "own ship's" position, and electrically written out. For example, $X_w$, $Y_w$, where w represents 1, 2, 3, ..., n entries in the "Save Array," signify the total number of X, Y grid positions of the entries in the computer's Save Array" memory function. Thus, the position of each entry of "other ship" constitutes an electrical signal which is passed to conductor 59 for suitable formatting for screen 64.

With regard to conversion of polar-to-rectangular coordinates (element 52), Texas Instruments Corporation, Houston, Tex., has long prior to the filing date of the parent application to this application produced and sold its Model SR-56 hand calculator which provides for this conversion. Garrett Air Research Corporation, Torrance, Calif., long prior to the filing date of the parent application to this application, has made and sold its Models AIR-NAV 100 and AIR-NAV 200 converters, comprising part numbers 210084 (central processing unit), 210086 (control display unit), and 2100884 (remote switching unit), all of which converts $\rho$ and $\theta$ bearings to X-Y or latitude-longitude coordinates.

Also, area-navigation-computer-exact-specifications ARINC 582, infra, and which have been in existence long prior to the filing date of the parent application to this application, accomplishes the functions required of the converter 52.

The aforenoted functions for the units 54, 56 together with the function of the generator 62, where the generator is incorporated into the hardware of the computer 50, can be implemented through "firmware", such as a Programmable Read Only Memory (PROM). Such firmware is in common use, prior to the filing date of the parent application to this application, and found in many microprocessors. Typical examples, suitable for use in this invention, are the Intel Microprocessor, Intel Corporation, 3065 Bowers Ave., Santa Clara, Calif. 95051; Pro-Log PROM Series 90, Pro-Log Corporation, 2411 Garden Rd., Monterey, Calif. 93940; both using the TI 8080 or equivalent chip (Texas Instruments) which performs all three functions.

FIG. 3 illustrates a three-dimensional field-of-use view for the invention. The position of "own ship" is identified by reference character 80, and is shown to be centered within an envelope 81 representing altitude discrimination and limitations of the pictorial display means 60. "Other ship" positions are represented by reference characters 82, 83, 84, 85, each of which has its own respective envelope 86, 87, 88, 89. The horizontal lines 81h of the envelope 81 represent the limits of a band of altitude about "own ship" position and for which unit 56 discriminates. I.e., unit 56 rejects those signals from of "other ships" not within such band. Only those signals from "other ships" positions within such lines 81h pass through and are pictorially displayed in means 60 provided such positions also fall between a pair of vertical lines 81v.

The vertical lines 81v represent a ring of desired limitation of reception of signals from "other ships" in the vicinity, for the purpose of display on graphic screen 64. Although radio line-of-sight broadcast transmission extends generally to the horizon, the invention's utilization is not concerned with such a great distance. The FM transmitter or transceiver 42 is relatively low-powered because its effective speaking voice is carried to and beyond the radio line-of-sight.

The purpose of the referenced envelopes 86–89 about the positions of the "other ships" 82–85, each drawn in a slightly different manner of illustration than the next one to show association with a particular position, are the same as that of envelope 81 about position 80, and detailed descriptions therefor are deemed not necessary.

In existing present-day patterns of movements, the positions of each of the ships 80–85 are controlled by ground facilities 90, via two-way voice communication. The pilots of these ships have not been able to monitor their own positions and altitudes among and relative to themselves in an independent manner of such ground control. However, it is now apparent that with this invention, such monitoring is accomplished.

Operation

The "own ship" 80 (FIG. 3) derives its geographical position from the on-board VORTAC navigation receiving set 53 (for purposes of the present illustration, VORTAC, with which virtually aircraft of all airlines operating in the U.S. airspace are equipped, is considered) and derives its altitude from an on-board air data system 30, 32. The geographical position of "own ship" 80 from the VORTAC set 53 is reported in terms of its range and bearing relative to a VORTAC ground facility, such as at 90, and this is displayed on special and known instruments for use by the pilot. This geographical position is also used in this invention to report "own ship" position on the screen 64. For this usage, however, its definition is converted via the functioning of unit 52, from its range and bearing relative to the VORTAC ground facility 80, obtained by VORTAC set 53, to a Cartesian coordinate reference frame common to all aircraft and facilities in the area; e.g., X—Y or latitude-and-longitude.

The altitude, derived from the known on-board air data system 30, 32, is already display (state-of-the-art) on-board for pilot use. For the purposes of this invention, it is passed to the on-board encoder 34, which converts the signal from the altitude reference base unit 32 into a digital form, and, together with the ship's identity from identity unit 36, passes on to the Air Traffic Control transponder 14, which in turn transmits it to the ground based Secondary Surveillance Radar in response to SSR interrogations. This altitude signal, as used in the present invention, is taken from the encoder 34 and sent to the discriminator unit 56 of the computer 50. Here it is used directly, since it is already in digital form, as an altitude reference against which to compare altitude data received from "other ships". It is thus used as the basis for establishing a band of altitudes of interest for surveillance and monitoring by the ship 80 of other vicinity air traffic. It is then combined with "own ship" geographical position data at synchronizer unit 54 and passed on to the function generator 62 via the conductor 59, on the one hand, and passed on to the modulator 43, which transforms the total "own ship" altitude and position data into a form that modulates the FM transmitter 42, which operates on a frequency of, say, 1000 mHz. The output from this transmitter 42 is then fed to a multiplexer 46, which transmits it on an 0.2% (0.002) duty cycle for broadcast.

This broadcast is picked up by all other cooperating aircraft in the area. Each cooperating aircraft in the area; e.g., 82, 83, 84, 85, etc., is similarly equipped and operates with this invention in an identical manner. Since each aircraft broadcasts its altitude and geographical position randomly on an 0.2% (0.002) duty cycle, each "listens" to receive the "other ship" messages on an 0.98% (0.098) duty cycle—a receive/transmit ratio of 500 to 1. These messages from all cooperating aircraft within the radio line of sight are received when the multiplexer 46 is in the receive mode, and are passed on to the FM receiver 44, tuned to the transmit frequency of about 1000 mHz. Here they are demodulated and passed on to the altitude discriminator unit 56 of the computer 50. All such messages which include altitude reports outside a band of "own ship" altitude, say, as an example, of ±2000 feet, are rejected. All such messages reporting altitudes within the band of "own ship's" altitude ±2000 feet are accepted, and then synchronized in unit 54 so that they do not overlap or in any way interfere with each other or with the "own ship" data brought to this unit 54 from the on-board navigation and air data systems. When all these messages are properly synchronized, they are fed to the function generator 62 which formats the messages to be compatible with the specific characteristics of the graphic display screen 64. Thus, aircraft 85 (FIG. 3) is displayed on the screen 64 in aircraft 80 while aircraft 84 will just begin to appear on such screen. Both aircraft 82 and 83 do not appear on the screen, as aircraft 82 lies without the preselected band or ring of altitude about aircraft 80 and aircraft 83 does not yet lie within the scaled distance displayed on the screen 64.

The same analysis may be made for each cooperating aircraft 82–85.

It is evident that a conventional general purpose digital computer is employed here for coupling together in a cooperative relationship inputs thereto for attaining the desired outputs fed to means 60 through the conductor 59 and to the modulator 43 via the conductor 58.

The function generator 62, well known in the art, may be a part of the computer 50 and as indicated above or, as shown, be tied in directly to the graphic screen 64. In either case, the generator 62 takes the electronic signals from the computer 50 and modifies them to be compatible with the specific requirements of the graphic screen 64. It, or the computer if a separate unit is used, also produces the fading of each successive position signal so that the vector of each accepted aircraft is shown as a bright spot followed by a series of successively dimmer spots. This is accomplished by known equipment and in known manner such as by use of a surface phosphor which has some persistence, with the persistence rate being controlled electrically in known manner. Also, on some graphic screens, as each new position in put is received, the earlier inputs are dimmed by reducing the voltage of the signal as each new input is received.

Several different display systems or techniques are usable with this invention. Probably the most commonly used and best understood display is the Cathode Ray Tube (CRT) such as used in TV sets. This type of display is easily adaptable to the present display, and the compatibility of the computer output at conductor 59 with any specific CRT is achieved in the function generator 62. A disadvantage of the CRT is its bulk, especially in its depth dimension.

Another display, which is recommended by its physical configuration, is a plasma display. Here a rectangular format is used, with its depth limited to perhaps 1½ to 2 inches. It is thus more convenient to install or handle, and may be used as a hand-held "electronic clip board". In this instance, a detachable umbilical cord (not shown) containing the conductor 61 may be utilized, where all elements of the inventive system shown in FIG. 2 are stationarily mounted in the aircraft, except for the graphic screen 64.

The present writeup shows VORTAC as the on-board navigational system. It should be understood that any known navigation system extant may be used to provide "own ship" position. If VORTAC is used, since its coordinates are in terms of distance and bearing relative to a VORTAC ground facility, the on-board position is used in this form. To relate this position to the positions of ground facilities or to other aircraft, the coordinates must be translated into a common reference frame. While there are several such common reference frames in use throughout the world, the one most commonly used and universally accepted is latitude-and-longitude, so this is used here. Any navigation system that defines aircraft position, in any coordinates that can be transformed into latitude and longitude or any Cartesian (X-Y) reference frame can be used. This includes Inertial Navigators, radio direction finding systems, LORAN A, B, C or D, Shoran, Consol, etc.

It should be understood that this system and method is not limited to use in aircraft. It is contemplated for any navigatible vehicle, on ground, in the sea, and in space.

In regard to ARINC characteristics for the existing on-board equipment illustrated in FIG. 1, they are as follows:

| Element | Ref. Ch. | ARINC Characteristic No. |
|---|---|---|
| ATC Transponder | 14 | 572 |
| VHF Trans./Rec. | 24 | 546 |
| Air Data Unit | 30 | 565 |
| Altitude Unit | 32 | 549 |
| Identity Unit/Encoder | 36/34 | 545 |

These noted characteristics are numerically identified and described in publications published by Aeronautical Radio, Inc. (ARINC), 2551 Riva Road, Annapolis, Md. 21401. Each of these publications is directed to a specifically numbered characteristic and sets forth the design standards for electronic equipment and systems utilized in aircraft. Equipment manufacturers address themselves to these publications in order to build particular state-of-the-art pieces of equipment which meet such standards. The above table illustrates not only such characteristics for the state-of-the art pieces of equipment illustrated in FIG. 1, but also indicates the compatibility of a particular combination of such pieces and which are presently utilized today in commercial service.

Pursuant to the requirements of the patent statutes, the principle of this invention has been explained and exemplified in a manner so that it can be readily practiced by those skilled in the art to which it pertains, such exemplification including what is presently considered to represent the best embodiment of the invention.

Therefore, what I claim as patentably novel is:

1. A system apparatus for monitoring the movement of at least one "other ship" comprising in combination,
    means for receiving a signal on the position and altitude of the "other ship" within a transmit-receive duty cycle,
    means operatively connected to said receiving means for demodulating its signal,
    first means for converting into a Cartesian or like coordinate reference frame a signal representing "own ship" position,
    second means for discriminating against a signal representing the altitude of an "other ship" not within a preselected band of "own ship" altitude,
    third means for synchronizing an altitude signal and converted position signal of "own ship" and a signal of the "other ship" not discriminated against and within such preselected band of altitude,
    means for graphically displaying "own ship" and "other ship" relative positions operatively connected to said synchronizing means,
    whereby a representation of "other ship" lying within the preselected band of altitude about "own ship" is visually observed on said display means.

2. The apparatus of claim 1 including a means for receiving "own ship" navigational position, said receiving "own ship" navigational position means being operatively connected to said first means,
    whereby the signal representing such navigational position is converted by said first means into Cartesian or the like coordinates.

3. The apparatus of claim 1 including means for encoding the signal representing the altitude of "own ship", said encoding means operatively connected to said second means, such signal thereafter being combined in said third means with the converted signal representing "own ship" geographical position data and thereafter such combined data being passed on to said display means.

4. The apparatus of claim 3 including a means for receiving "other ship" navigation position, said receiving "other ship" navigational position means being operatively connected to said second means,
    whereby the signal representing such navigation position is either accepted or rejected by said second means.

5. A method of monitoring the movement of at least one "other ship" in relation to "own ship" comprising in combination,
    converting the navigation position signal of "own ship" into a Cartesian or the like coordinate reference frame,
    combining such converted signal with the altitude signal of "own ship",
    receiving an incoming like-converted signal on an "other ship" position and on its altitude,
    demodulating the incoming like-converted signal,
    discriminating against the incoming like-converted signal, such discrimination representing the altitude of the "other ship" not within a preselected band of "own ship" altitude,
    synchronizing the "own ship" combined signal and the incoming like-converted signal not discriminated against, and
    displaying in suitable graphic presentation the output signals developed by said synchronizing step, such signals representing "other ship" position and the converted navigational "own ship" position.

6. The method of claim 5 including the step of receiving the "own ship" altitude signal which is then combined with the "own ship" converted navigational position signal.

7. The method of claim 5 including the step of receiving the "own ship" navigational position signal which is then converted as set forth.

8. The method of claim 7 including the step of receiving the "own ship" altitude signal which is then combined with the "own ship" converted navigational position signal.

9. A system apparatus for monitoring the movement of at least one "other ship" comprising in combination,
- a transmitting means for broadcasting a signal on the position and altitude of an "own ship" over a transmit-receive duty cycle,
- means for receiving a signal on the position and altitude of the "other ship" within the transmit-receive duty cycle,
- means operatively connected to said transmitting and receiving means for accomplishing such a cycle therebetween,
- means operatively connected to said transmitting and receiving means for respectively modulating and demodulating their signals,
- first means for converting into a Cartesian or like coordinate reference frame a signal representing "own ship" position,
- second means for discriminating against a received signal in which the altitude of an "other ship" is not within a preselected band of "own ship" altitude,
- third means for synchronizing an altitude signal and converted position signal of "own ship" and a received signal of the "other ship" not discriminated against and within such preselected band of altitude,
- said synchronizing means being operatively connected to said modulating means whereby the "own ship" signal on its position and altitude is broadcast through said transmitting means, and
- means for graphically displaying "own ship" and "other ship" relative positions operatively connected to said synchronizing means.

10. The apparatus of claim 9 including a means for receiving "own ship" navigational position, said receiving "own ship" navigational position means being operatively connected to said first means.

11. The apparatus of claim 9 including means for encoding the signal representing the altitude of "own ship", said encoding means being operatively connected to said second means.

12. The apparatus off claim 11 including a means for receiving "own ship" navigational position, said receiving "own ship" navigational position means being operatively connected to said first means.

* * * * *